United States Patent
Lin et al.

(10) Patent No.: US 6,204,939 B1
(45) Date of Patent: *Mar. 20, 2001

(54) COLOR MATCHING ACCURACY INSIDE AND OUTSIDE THE GAMUT

(75) Inventors: Tsung-Nan Lin; Joseph Shu, both of San Jose, CA (US)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/050,862

(22) Filed: Mar. 30, 1998

(51) Int. Cl.$^7$ .................................................. G03F 3/08
(52) U.S. Cl. ............................ 358/518; 358/504; 358/1.9
(58) Field of Search ................................... 358/504, 518, 358/523, 520, 505, 515, 516, 537, 1.9

(56) References Cited

U.S. PATENT DOCUMENTS

| | | | |
|---|---|---|---|
| 4,992,861 | * 2/1991 | D'Errico | 358/518 |
| 5,111,286 | * 5/1992 | MacDonald et al. | 358/500 |
| 5,289,297 | * 2/1994 | Bollman et al. | 358/537 |
| 5,339,176 | * 8/1994 | Smilansky et al. | 358/504 |
| 5,416,614 | * 5/1995 | Crawford | 358/530 |
| 5,452,112 | 9/1995 | Wan et al. | 358/504 |
| 5,481,380 | * 1/1996 | Bestmann | 358/504 |
| 5,483,360 | 1/1996 | Rolleston et al. | 358/518 |
| 5,489,998 | 2/1996 | Yamada et al. | 358/523 |
| 5,491,568 | 2/1996 | Wan | 358/518 |
| 5,543,940 | 8/1996 | Sherman | 358/518 |
| 5,552,904 | 9/1996 | Ryoo et al. | 358/518 |
| 5,561,459 | 10/1996 | Stokes et al. | 348/180 |
| 5,581,376 | 12/1996 | Harrington | 358/518 |
| 5,583,666 | * 12/1996 | Ellson et al. | 358/518 |
| 5,594,557 | 1/1997 | Rolleston et al. | 358/518 |
| 5,610,732 | 3/1997 | Komatsu | 358/525 |
| 5,627,950 | * 5/1997 | Stokes | 395/131 |
| 5,692,071 | 11/1997 | Govaert | 382/167 |
| 5,699,489 | * 12/1997 | Yokomizo | 395/109 |
| 5,704,026 | 12/1997 | Wan | 395/131 |
| 5,712,925 | 1/1998 | Ohga | 382/167 |
| 5,786,908 | * 7/1998 | Liang | 358/518 |

OTHER PUBLICATIONS

SPIE Optical Engineering Press, "*Color Technology for Electronic Imaging Devices*", 1997, pp. 64–101, 141–152 and 248–251, H.R. Kang,.

* cited by examiner

*Primary Examiner*—Edward L. Coles
*Assistant Examiner*—Mark Wallerson

(57) ABSTRACT

The present invention is directed to an apparatus and a method to improve color matching between original color images and reproductions of those images. The present invention is implemented by a look-up table that maps colors from a first color space to a second color space for a color image reproduction system comprising an input device and an output device is achieved by identifying a region of the second color space in which the accuracy of the transformation is to be improved, obtaining a medium conveying a selected color within the region of second color space, scanning the medium with the input device to obtain first values representing the selected color in the first color space, applying the transformation to map the first values to second values in the second color space and determining a transformation error for the map, and modifying one or more entries in the look-up table to effect a change in the transformation so as to reduce the transformation error.

10 Claims, 11 Drawing Sheets

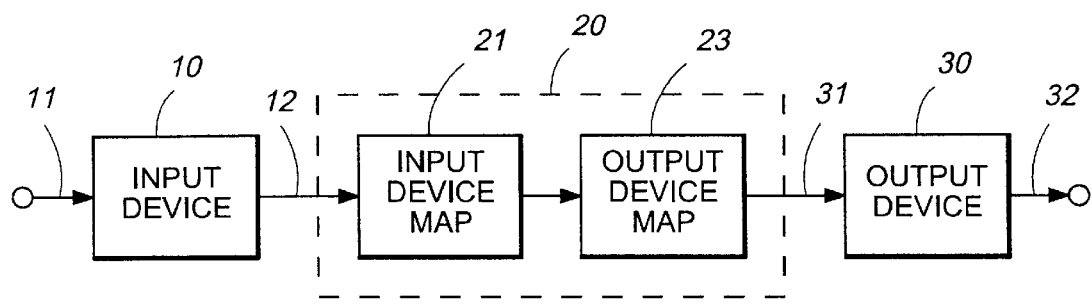
FIG._1
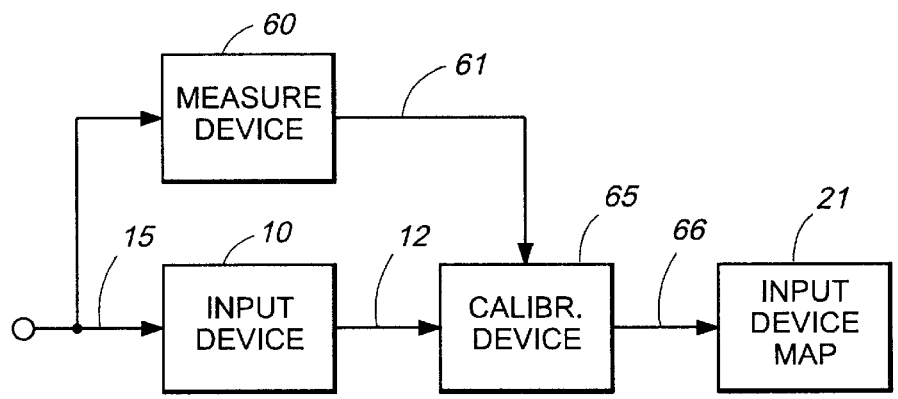
FIG._2A
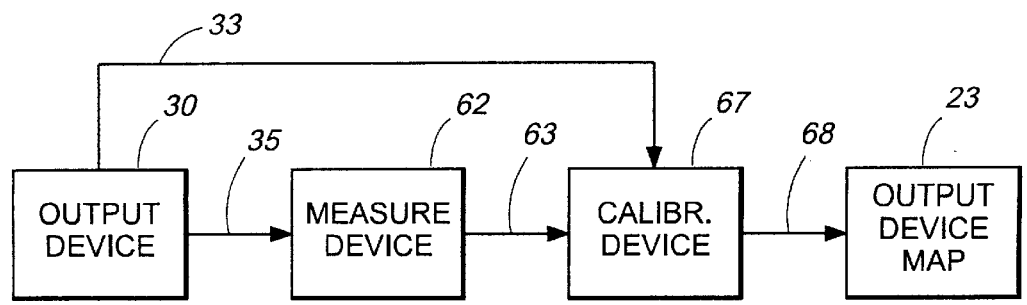
FIG._2B

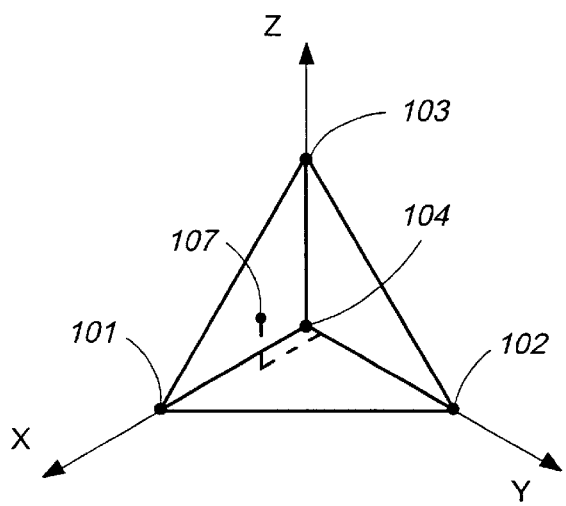
FIG._3A
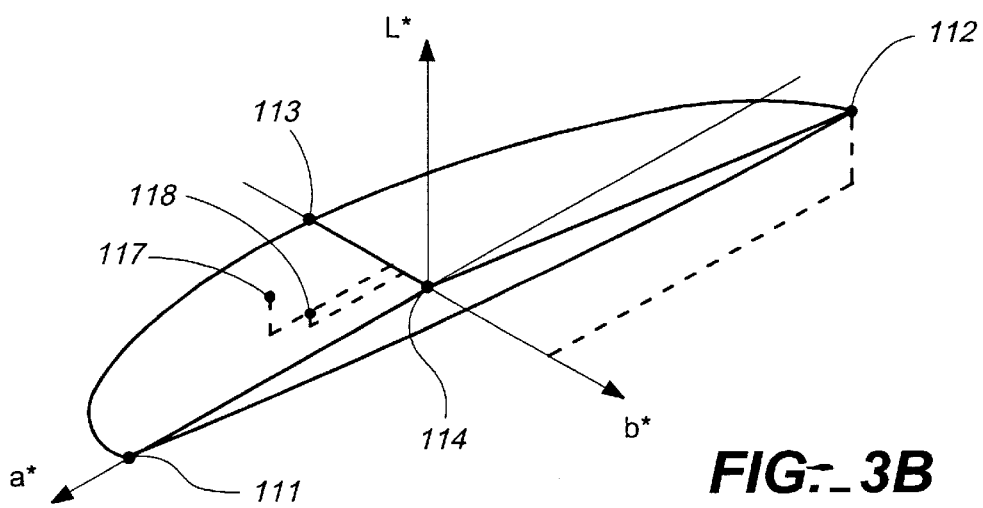
FIG._3B
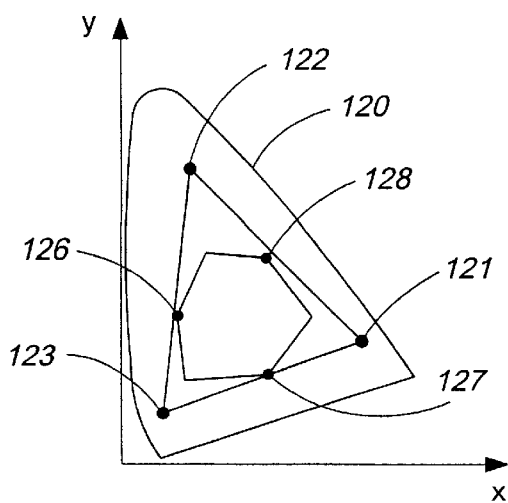
FIG._4

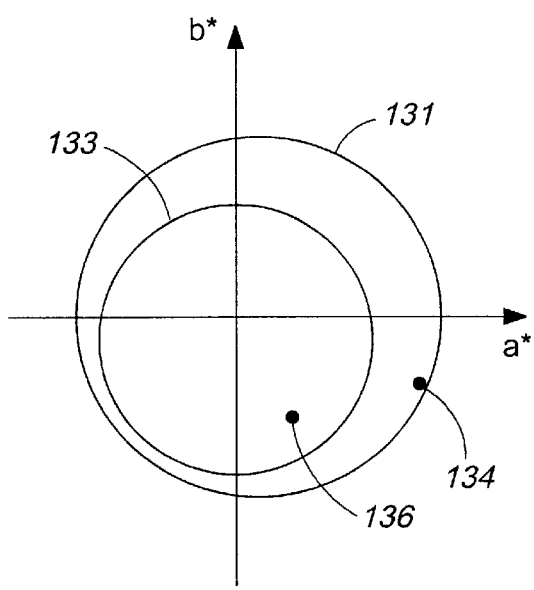
FIG._5A
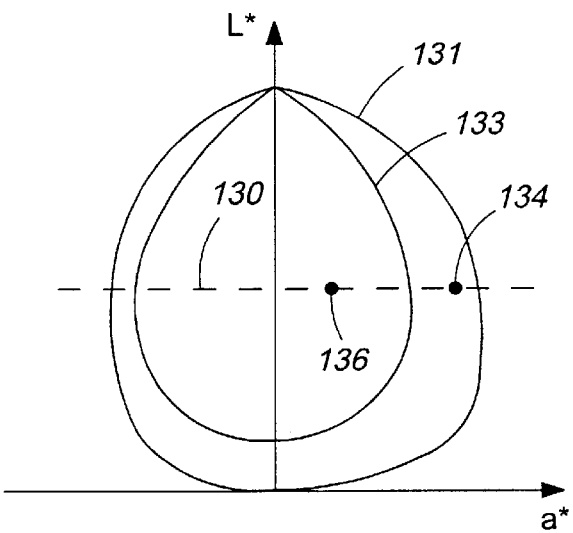
FIG._5B
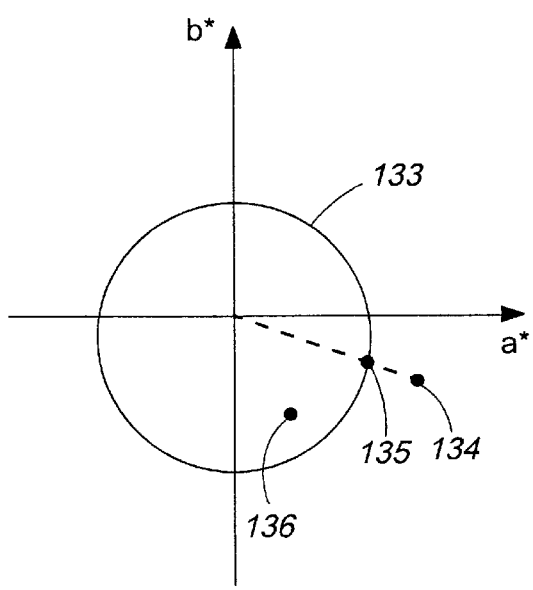
FIG._6A
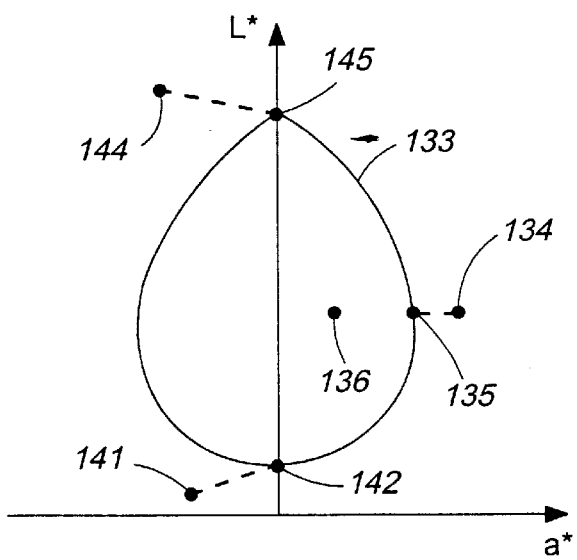
FIG._6B

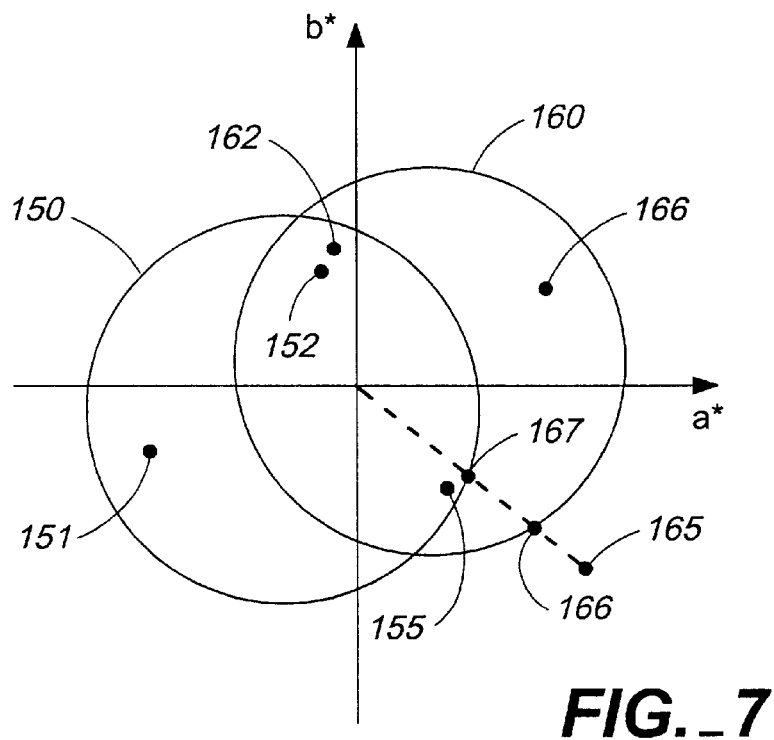
FIG._7
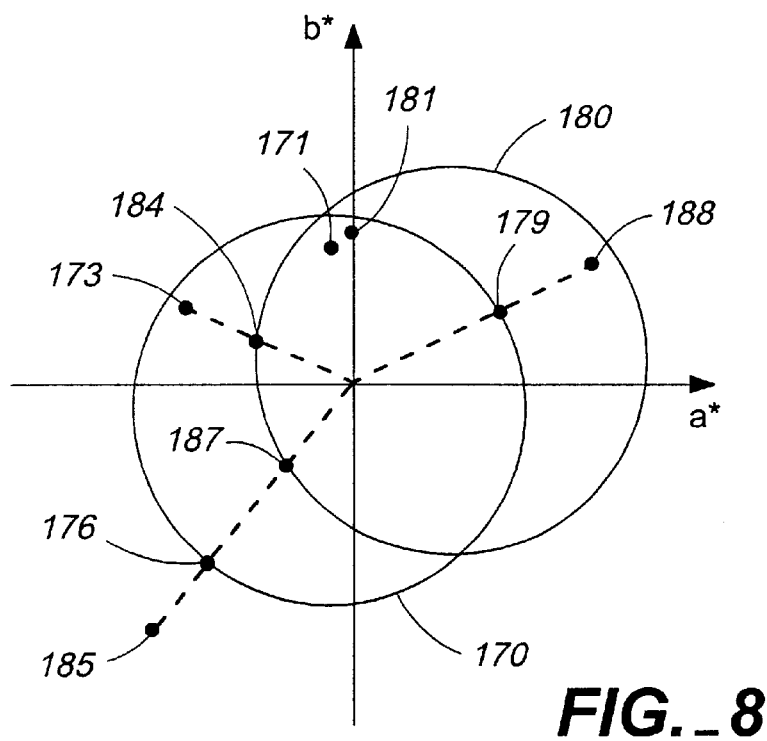
FIG._8

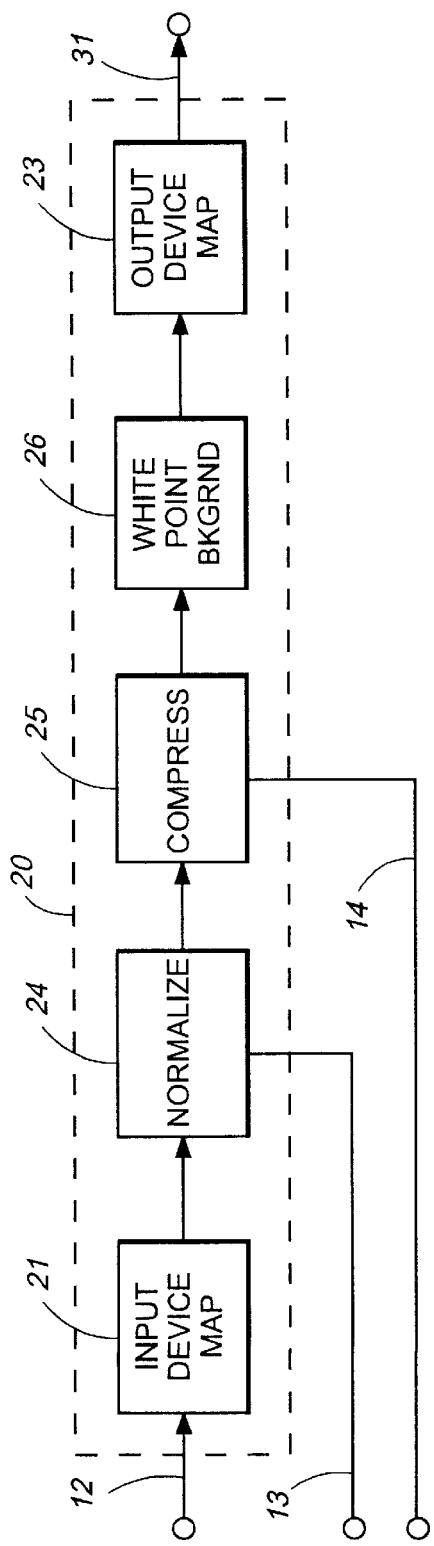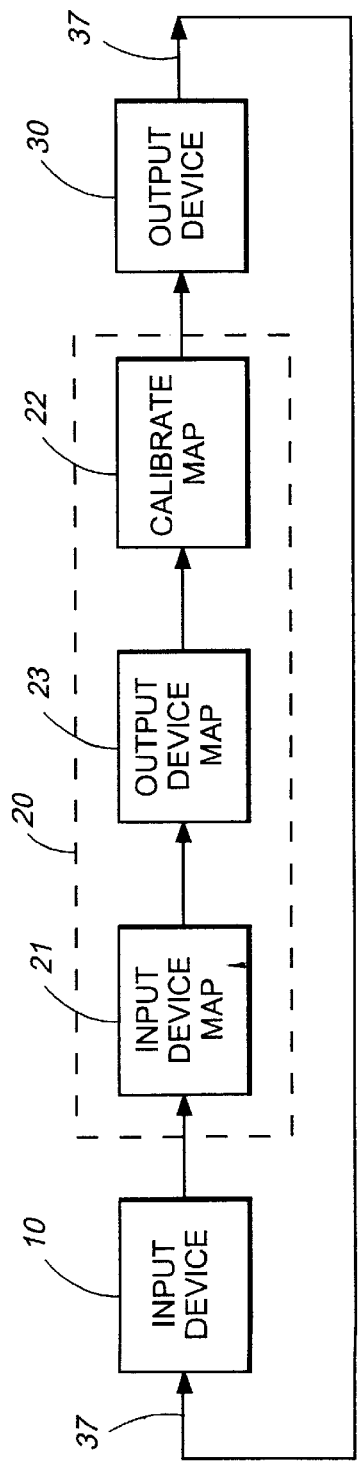
FIG._9
FIG._10

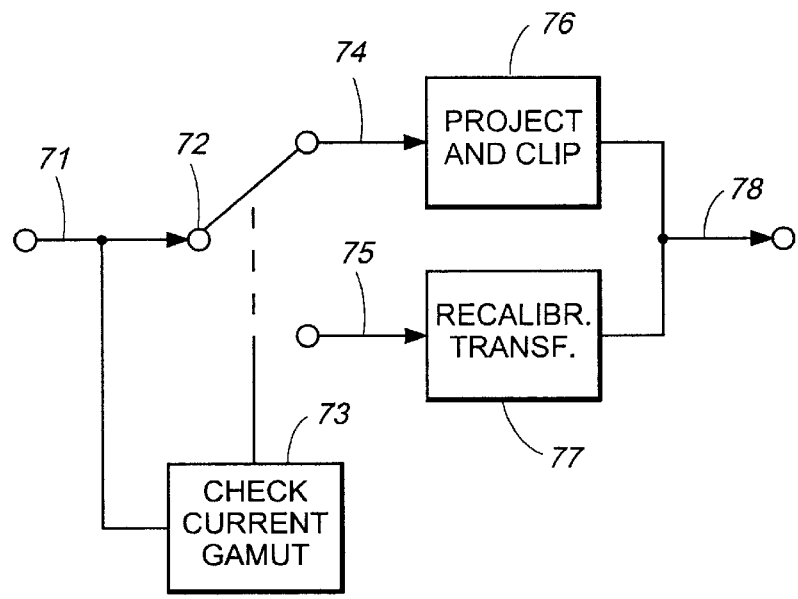
FIG._11
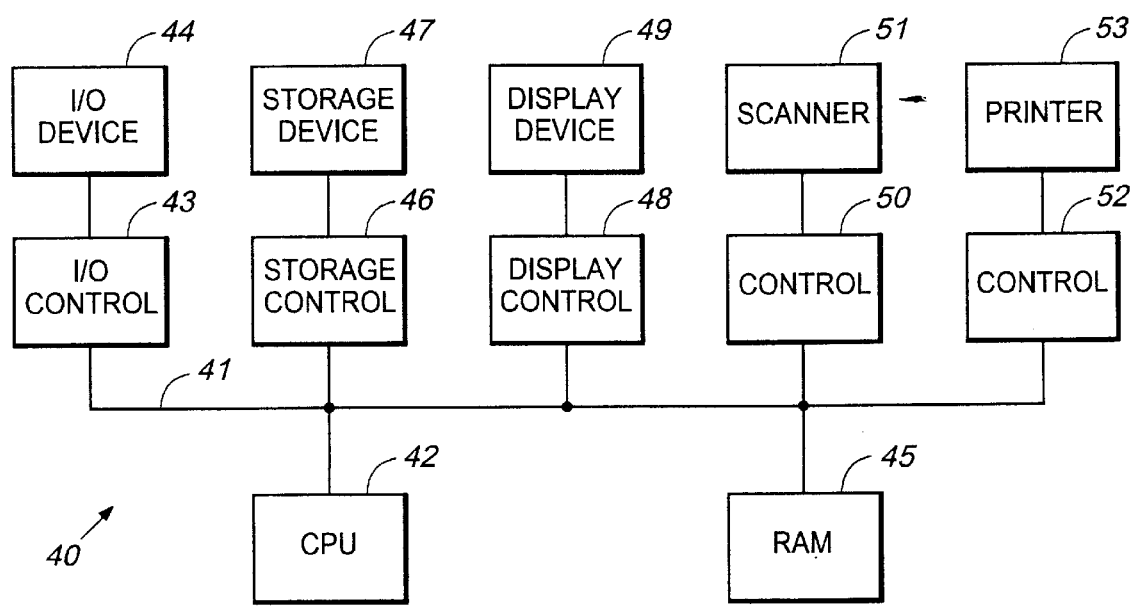
FIG._12

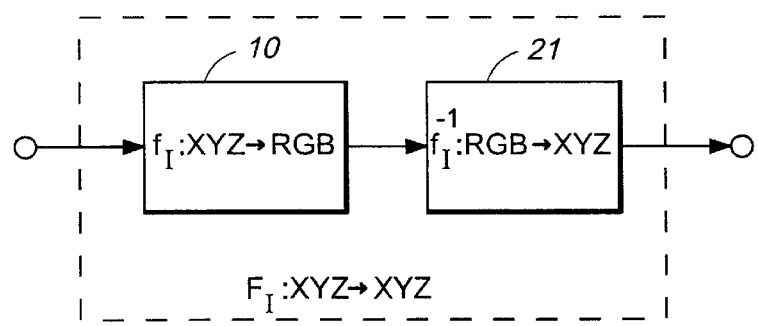
FIG._13A
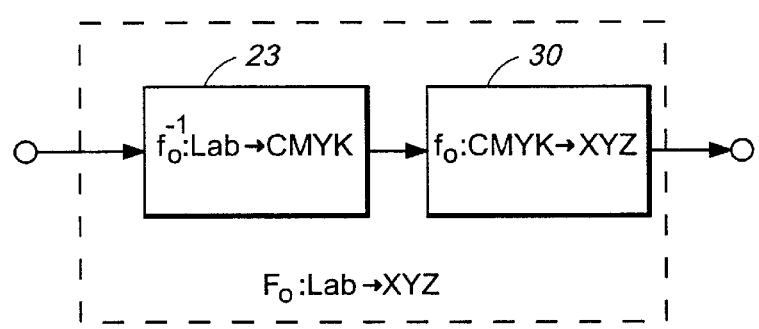
FIG._13B
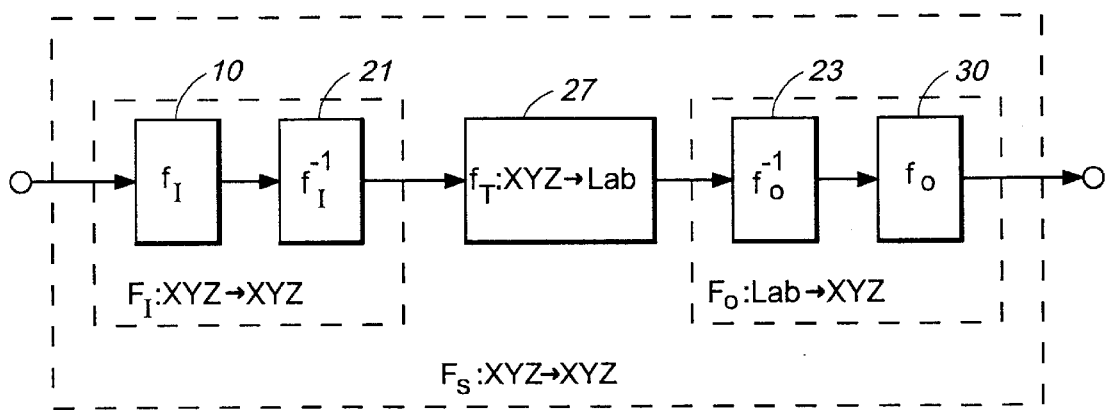
FIG._13C

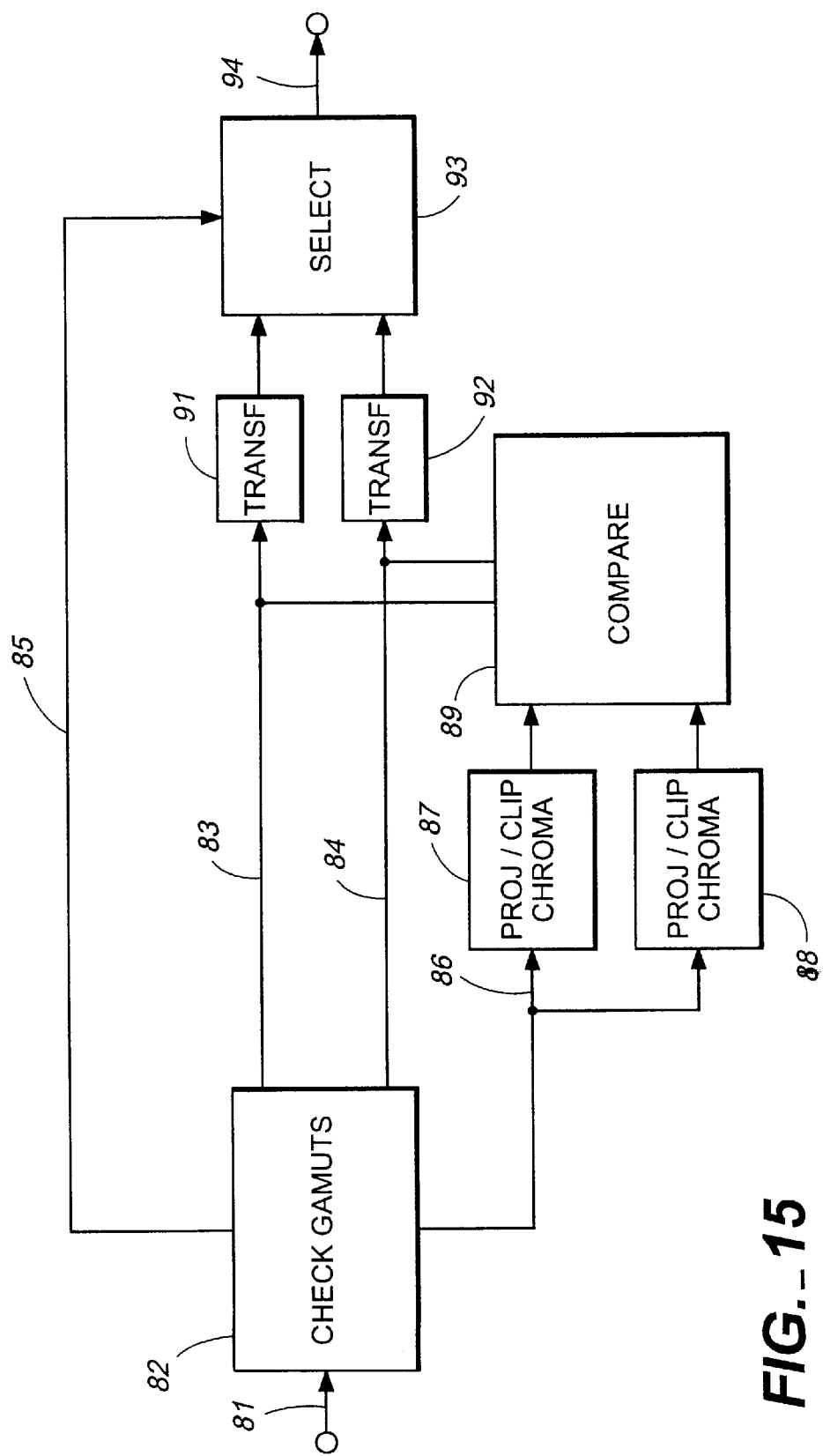
FIG._15

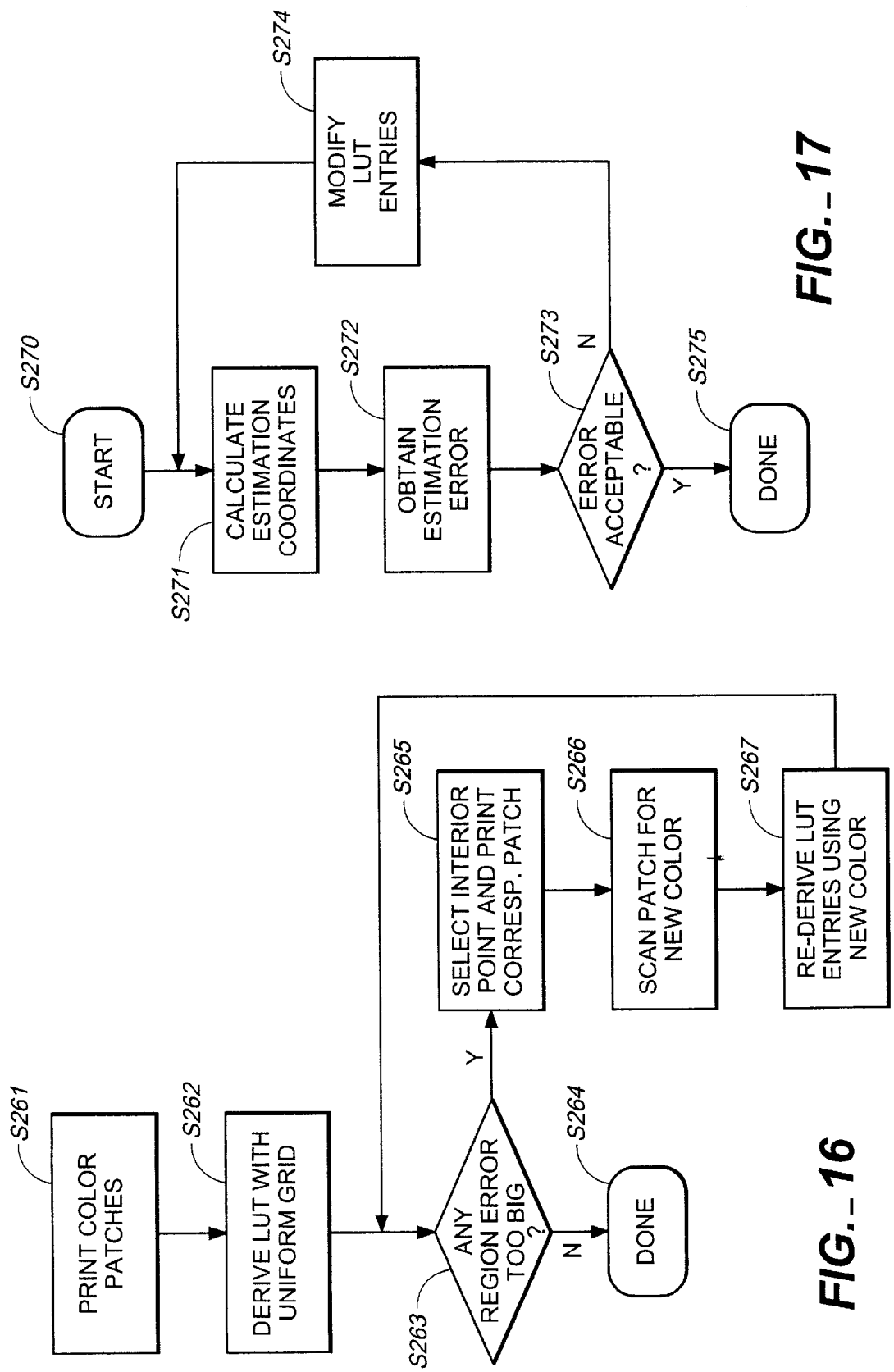

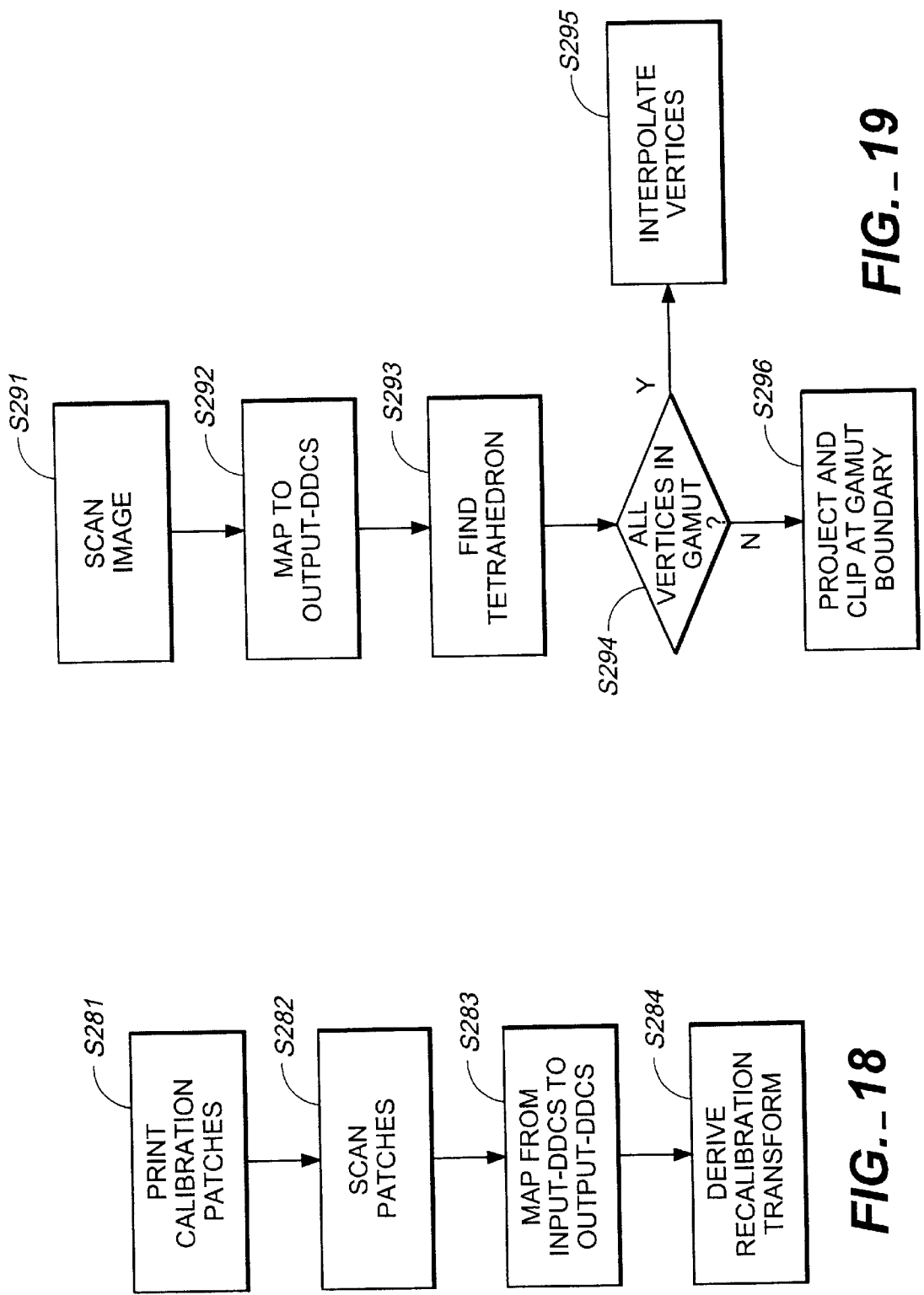
FIG._19
FIG._18

COLOR MATCHING ACCURACY INSIDE AND OUTSIDE THE GAMUT

CROSS-REFERENCE TO RELATED APPLICATIONS

This application is related to U.S. patent application entitled "Device-Independent and Medium-Independent Color Matching Between an Input Device and an Output Device" identified by Ser. No. 09/050,860, U.S. patent application entitled "Improved Scanner Calibration Technique to Overcome Tone Inversion" identified by Ser. No. 09/050,866 and U.S. patent application entitled "Self-Calibration for Color Image Reproduction System" identified by Ser. No. 09/050,862 all filed concurrently with this application.

TECHNICAL FIELD

The present invention relates generally to color image reproduction systems, and relates more particularly to features that improve color matching between original color images and reproductions of those images.

BACKGROUND ART

Overview

Color image reproduction systems typically include an input device for obtaining a representation of an original image, an output device for generating a replica of the image, and a controlling device that processes signals received from the input device to generate new signals sent to the output device to produce the replica, which preferably is a high-fidelity reproduction of the original image. The controlling device may be implemented by a general-purpose computer with appropriate software and/or hardware for peripheral control and signal processing. Examples of an input device include hand held, flatbed and sheet-fed optical scanners, digital and video cameras, and software applications. In other words, an original image may be sensed or it may be created by a process. Examples of an output device include ink jet, laser and photolithography printers, electrostatic, flatbed and drum plotters, and video displays such as cathode ray tubes, thin-film-transistor and liquid crystal display panels.

Generally, input and output devices use some device dependent color-coordinate system to specify colors. These coordinate systems are often specified in some device-dependent color space that conveniently maps the color coordinates to the color-sensing or color-generating process of the particular device. The term "color space" refers to an N-dimensional space in which each point corresponds to a particular color.

One example of a three-dimensional color space is an RGB space in which point coordinates specify particular amounts of red (R), green (G) and blue (B) colorant that additively combine to represent a specific color. The operation of many scanners and color display devices may be conveniently controlled by signals that are specified in RGB space. An example of a four-dimensional color space is a CMYK color space in which point coordinates specify particular amounts of cyan (C), magenta (M), yellow (Y) and black (K) colorant that subtractively combine to represent a specific color. Another example is the three-dimensional CMY color space. The operation of many ink jet and laser printers may be conveniently controlled by signals that are specified in CMYK space or CMY space. Other color spaces that are related to particular devices are also known.

Many practical devices are capable of sensing or reproducing only a portion of the full range of colors that can be discerned by a human observer. A device "gamut" refers to the range of colors that can be sensed or reproduced by a particular device. For example, the gamut of a particular scanner refers to the range of colors that can be sensed by that scanner and the gamut of a particular printer refers to the range of colors that can be reproduced or printed by that printer.

A scanner gamut is determined by a variety of factors including the spectral response of the optical sensors, the spectral characteristics of color filters, spectral characteristics of the illumination source and the resolution and linearity of analog-to-digital converters.

A printer gamut is determined by a variety of factors including spectral characteristics of colorants such as ink, spectral and porosity characteristics of media such as paper, resolution or dots-per-inch of the printed image, half-toning methods and use of dithering, if any.

A video display gamut is determined by a variety of factors including spectral characteristics of the light emitting material, type of display device, resolution of pixels or video lines, and excitation voltage.

Although it is possible in principle to construct a color image reproduction system by merely connecting an output device directly to an input device, the results generally would not be satisfactory because the device-dependent coordinate systems and color spaces for the input and output devices are generally not the same. Even if the two sets of coordinate systems and color spaces are the same, the fidelity of the reproduced image as compared to an original image would probably be very poor because the gamut of the input device generally is not co-extensive with the gamut of the output device. Values representing "out-of-gamut" colors that are not in the output device gamut cannot be reproduced exactly. Instead, some "in-gamut" color that is in the gamut of the output device must be substituted for each out-of-gamut color.

Color image reproduction systems can achieve high-fidelity reproductions of original images by applying one or more transformations or mapping functions to convert point coordinates in one color space into appropriate point coordinates in another color space. These transformations may be conveniently performed by the controlling device, mentioned above. In particular, with respect to the output device gamut, transformations are used to convert values representing in-gamut and out-of-gamut colors in an input-device-dependent color space (DDCS) into values representing in-gamut colors in an output-DDCS. The mapping of in-gamut colors and out-of-gamut colors is discussed separately.

Mapping In-Gamut Colors

The transformation of output device in-gamut colors for many practical devices are non-linear and cannot be easily expressed in some analytical or closed form; therefore, practical considerations make accurate implementations difficult to achieve. Many known methods implement these transformations as an interpolation of entries in a look-up table (LUT) derived by a process that essentially inverts relationships between device responses to known input values. For example, a transformation for an input device may be derived by using a medium conveying patches of known color values in some device-independent color space (DICS) such as the Commission International de L'Eclairage (CIE) 1931 XYZ space, scanning the medium with the input device to generate a set of corresponding values in some input-DDCS such as RGB color space, and constructing an input LUT comprising table entries that associate the known color XYZ values with the scanned RGB values. In subsequent scans of other images, scanned RGB values can be converted into device-independent XYZ values by finding entries in the input LUT having RGB values that are close to the scanned values and then interpolating between the associated XYZ values in those table entries. Various interpolation techniques such as trilinear, prism, pyramidal and tetrahedral interpolation may be used.

Similarly, a transformation for an output device may be derived by producing a medium with color patches in response to color values selected from some output-DDCS such as CMYK color space, determining the color value of the patches in a DICS such as CIE XYZ space by measuring the patches using a spectral photometer, and constructing an output LUT comprising table entries that associate the measured color XYZ values with the corresponding CMYK values. In subsequent output operations, XYZ color values can be converted into device-dependent CMYK values by finding entries in the output LUT having XYZ values that are close to the desired values and then interpolating between associated CMYK values in those table entries. Various interpolations such as those mentioned above may be used.

In operation, a color image reproduction system scans an original image to obtained scanned value in some input-DDCS, transforms the scanned values into some DICS, transforms these device-independent values from the DICS into some output DDCS and, in response, generates a replica of the original image. As mentioned above, the transformations described thus far apply only to output device in-gamut colors.

Mapping Out-of-Gamut Colors

By definition, output device out-of-gamut colors cannot be reproduced exactly. Instead, high-quality color image reproduction systems use transforms or mapping functions that substitute an in-gamut color for each out-of-gamut color. Preferably, these transforms attempt to minimize the perceptible difference between each out-of-gamut color and the corresponding substitute in-gamut color.

Techniques for transforming out-of-gamut colors into in-gamut colors generally map the out-of-gamut colors to the boundary of the output device gamut or compress a region of color space so that all desired colors are mapped into the output device gamut. U.S. Pat. No. 5,185,661 describes a technique which seeks to preserve the hue of out-of-gamut colors. The technique disclosed in U.S. Pat. No. 5,450,216 seeks to minimize perceptible changes in luminance or chrominance. U.S. Pat. No. 5,491,568 discloses a technique that projects out-of-gamut colors onto the gamut boundary along a line orthogonal to a gray line in color space. In U.S. Pat. No. 5,692,071, a disclosed technique maps each out-of-gamut color to the closest entry in a LUT. The technique disclosed in U.S. Pat. No. 5,712,925 divides the output device gamut into a higher-fidelity region and a lower-fidelity region and compresses all color space outside the higher-fidelity region into the lower-fidelity region.

DISCLOSURE OF INVENTION

It is an object of the present invention to improve the accuracy of color space transformations implemented by interpolation of look-up table entries without increasing the size or number of table entries.

According to the teachings of the present invention, improving the accuracy of a transformation implemented by a look-up table that maps colors from a first color space to a second color space for a color image reproduction system comprising an input device and an output device is achieved by identifying a region of the second color space in which the accuracy of the transformation is to be improved, obtaining a medium conveying a selected color within the region of second color space, scanning the medium with the input device to obtain first values representing the selected color in the first color space, applying the transformation to map the first values to second values in the second color space and determining a transformation error for the map, and modifying one or more entries in the look-up table to effect a change in the transformation so as to reduce the transformation error.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIG. 1 illustrates major components in a typical color image reproduction system.

FIGS. 2A and 2B illustrate major components for deriving transformations for input and output devices.

FIGS. 3A and 3B are schematic representations of points and regions in color spaces, particularly corresponding points and regions in CIE XYZ space and CIE L*a*b* space.

FIG. 4 is a schematic representation of two hypothetical gamuts within a two-dimensional projection of a normalized color space.

FIGS. 5A and 5B are schematic representations of points and hypothetical gamut boundaries in CIE L*a*b* space.

FIGS. 6A and 6B are schematic representations of points and transformational mappings onto the boundary of a hypothetical gamut in CIE L*a*b* space.

FIG. 7 is a schematic representation of respective gamuts for two printers or, alternatively, one printer operating in two different modes.

FIG. 8 is a schematic representation of a shift in the gamut of a hypothetical printer such as that caused by component aging, for example.

FIG. 9 illustrates major components in one embodiment of a controlling device that achieves an improved degree of device and media independence.

FIG. 10 illustrates major components in a color image reproduction system that provides recalibration of selected colors for an output device.

FIG. 11 illustrates one embodiment of a recalibration transformation.

FIG. 12 illustrates major components in a typical personal computer that may be used to implement various aspects of the present invention.

FIGS. 13A through 13C illustrate the end-to-end effects of input or output devices and the system components that implement device transformations.

FIG. 15 illustrates major components for deriving a transformation to overcome tone inversion.

FIG. 16 is flowchart illustrating one method for improving the accuracy of a transformation for in-gamut colors.

FIG. 17 is flowchart illustrating one method for improving the accuracy of a transformation for out-of-gamut colors.

FIG. 18 is flowchart illustrating one method for deriving a recalibration transformation FIG. 19 is a flowchart illustrating one method for using a recalibration transformation.

MODES FOR CARRYING OUT THE INVENTION

Color Image Reproduction System Overview

Figure 14:
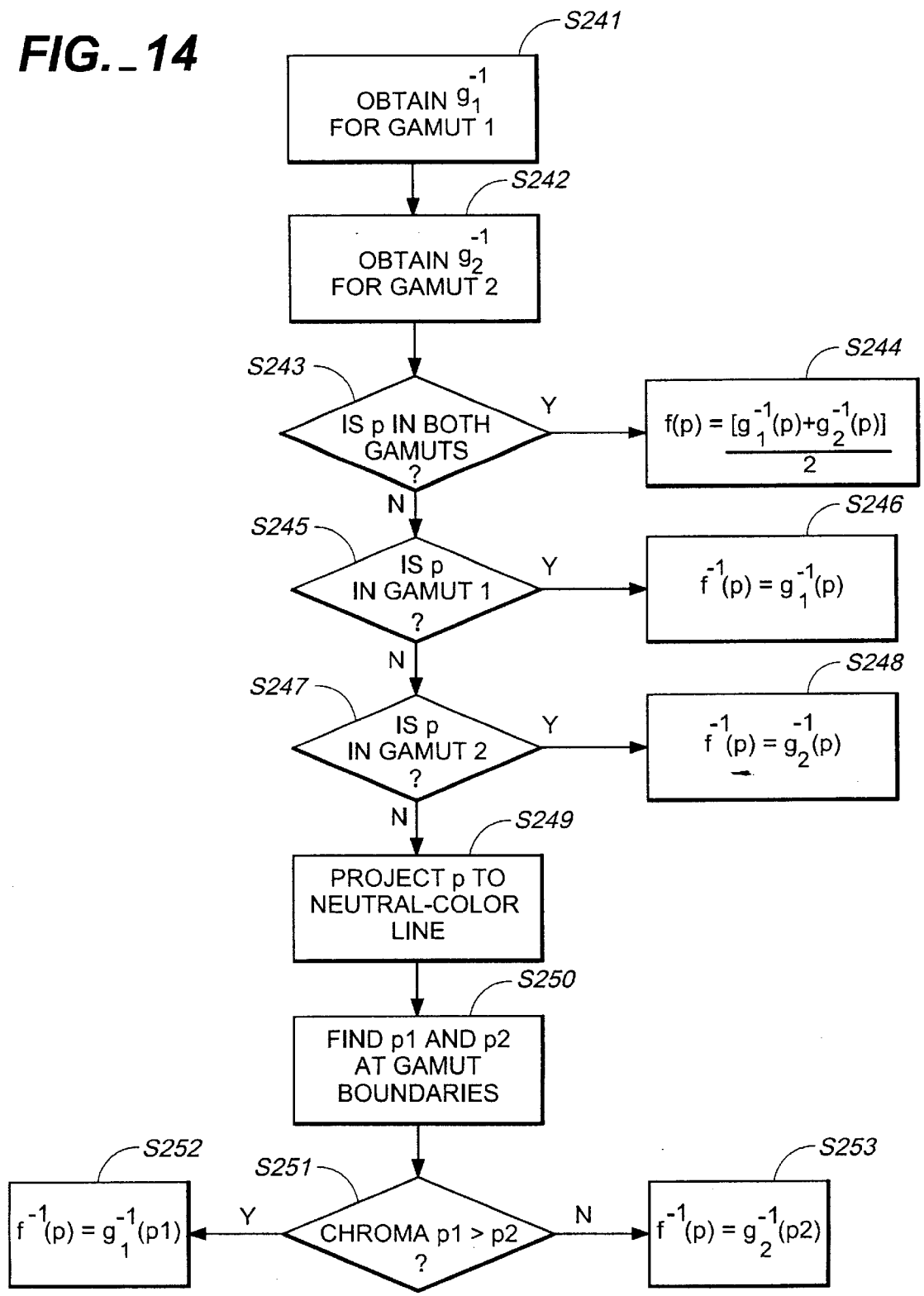
FIG. 14 is flowchart illustrating one method for deriving a transformation to overcome tone inversion.

FIG. 1 illustrates major components in a typical color image reproduction system. Input device receives from path 11 signals representing an original image and generates along path 12 an input-device-dependent representation of the original image. Controlling device 20 receives this representation from path 12 and, in response, generates along path 31 an output-device-dependent representation of the original image. Output device 30 receives this representation from path 31 and, in response, generates along path 32 a replica of the original image. The present invention is directed toward improving the fidelity with which the replica reproduces the original image.

Input device 10 may be essentially any type of scanner, camera or digital graphics application. If input device 10 is an optical scanner, for example, the signals received from path 11 could be considered to be optical. If input device 10 is an application for creating or manipulating color images, for example, the signals received from path 11 could be considered to represent commands or data. Throughout this disclosure, more particular mention will be made of optical scanners; however, many of the principles and features of the present invention may be applied in systems incorporating other types of input devices.

Output device 30 may be essentially any type of printer, plotter or display. If output device 30 is an ink-jet printer, for example, the replica generated along path 32 could be considered to be the printed image. If output device 30 is a CRT or TFT display, for example, the replica generated along path 32 could be considered to represent the image formed on the display device. Throughout this disclosure, more particular mention will be made of printers; however, many of the principles and features of the present invention may be applied in systems incorporating other types of output devices.

By its very nature, the characteristics of the input-device-dependent representation generated along path 12 depends on the characteristics of input device 10. Many optical scanners, for example, generate signals representing colors as points with red (R), green (G) and blue (B) coordinates in an RGB device-dependent color space (DDCS). For ease of discussion herein, the input-DDCS will generally be referred to as RGB space; however, many other color spaces and representations may be used to practice the present invention.

Similarly, the characteristics of the output-device-dependent representation generated along path 31 are chosen to match the characteristics of output device 30. Many color printers, for example, generate images in response to values representing cyan (C), magenta (M), yellow (Y) and black (K) coordinates in a CMYK DDCS. Many display devices such as cathode ray tubes or thin-film-transistor panels generate images in response to values representing red, green and blue in an RGB DDCS. Because of the device-dependent nature of these color spaces, scanner RGB spaces should not be equated to display RGB spaces. For ease of discussion herein, the output-DDCS will generally be referred to as CMYK space; however, many other color spaces and representations may be used to practice the present invention.

Controlling device 20 is responsible for transforming signals representing the original image in the input-DDCS into signals representing the same image in the output-DDCS. This may be accomplished by using input-device map 21 to transform the input-DDCS signals into a representation in a device-independent color space (DICS), and using output-device map 23 to transform the DICS representation into the signals representing the same image in the output-DDCS. Controlling device 20 may include other transformations and processes such as those described herein.

Controlling device 20 may be implemented by software and/or hardware in a general-purpose computer such as that illustrated in FIG. 12. FIG. 12 is a functional block diagram of one embodiment of a typical personal computer system 40. CPU 42 provides computing resources. I/O control 43 represents an interface to I/O device 44 such as a keyboard, mouse or modem. RAM 45 is system random access memory. Storage control 46 represents an interface to storage device 47 that includes a storage medium such as magnetic tape or disk, or an optical medium. The storage medium may be used to record programs of instructions for operating systems, utilities and applications, and may include embodiments of programs that implement various aspects of the present invention. Display control 48 provides an interface to display device 49. Control 50 represents an interface to scanner 51 which is an input device like an optical scanner. Control 52 represents an interface to printer 53 which is an output device like an ink jet color printer. Devices like scanner 51 may serve as input device 10 and devices like display device 49 or printer 53 may serve as output device 30.

In the embodiment shown, all major system components connect to bus 41 which may represent more than one physical bus. For example, some personal computers incorporate only a so called Industry Standard Architecture (ISA) bus. Other computers incorporate an ISA bus as well as a higher bandwidth bus conforming to some bus standard such as the VESA local bus standard or the PCI local bus standard. Preferably, display control 48 connects to a high-bandwidth bus to improve the speed of display. A bus architecture is not required to practice the present invention.

The functions of one or more computer components as well as various aspects of the present invention can be implemented in a wide variety of ways including discrete logic components, one or more ASICs and/or program-controlled processors.

Controlling device 20 may also be implemented by a special-purpose device. The mainer in which controlling device 20 is implemented is not important to the present invention. For example, the following disclosure will sometimes refer to implementations that store tables in RAM merely for ease of discussion. Other implementations including digital and analog processing circuitry may used.

Derivation of Input and Output Maps

FIGS. 2A and 2B illustrate major components for deriving input-device map 21 and output-device map 23. These illustrations and the following discussion are presented merely as examples to illustrate principles. These maps or transformations may be derived in other ways.

Referring to FIG. 2A, input-device map 21 may be derived by scanning an image 15 that has known color characteristics. For example, image 15 may be one or more sheets of paper with areas or "patches" of known color. The color characteristics of these patches may be determined by measure device 60 such as a spectral photometer or calorimeter. According to the technique shown in the figure, measure device 60 scans image 15 and generates signals along path 61 representing the colors of the patches in some DICS such as the Commission International de L'Eclairage (CIE) 1931 XYZ space, referred to herein as CIE XYZ space. Input device 10 scans image 15 and generates signals along path 12 representing the colors of the patches in an input-DDCS such as scanner RGB space.

The device-independent and the device-dependent representations generated along paths 61 and 12, respectively, provide selected points in the two color spaces that define a forward function $f_I$ representing the way in which input device 10 converts real-world colors into a device-dependent representation. In response to these signals, calibration device 65 derives input-device map 21 which is an inverse function $f_I^{-1}$ from the DCCS to the DICS. For example, if measure device 60 generates values in CIE XYZ space and input device 10 generates signals in some RGB space, then the forward function corresponding to input device 10 may be denoted as $f_I$: XYZ→RGB and the inverse function corresponding to input-device map 21 may be denoted as $f_I^{-1}$: RGB→XYZ.

The way in which these two components work together is illustrated in FIG. 13A. Input device 10 effects a transformation $f_I$ on values representing real-world colors to obtain values in some input-DDCS. It is often convenient to represent real-world colors in some DICS such as CIE XYZ space. The transformation may then be expressed as a mapping from CIE XYZ space to some input-DDCS such as an RGB space as described above. Input-device map 21 effects a transformation $f_I^{-1}$ on the values in the input-DDCS to obtain mapped values in some DICS such as CIE XYZ space. The end-to-end effects of these two components is to effect a transformation from one DICS to another DICS. According to the example discussed above and illustrated in the figure, the transformation is, in principle, similar to the identify matrix that maps from CIE XYZ space to CIE XYZ space, which may be denoted as $F_I$: XYZ→XYZ. In practice, however, arithmetic round off errors and interpolation errors introduce noise into the process.

Referring to FIG. 2B, output-device map 23 may be derived by using output device 30 to generate image 35 and determining the color characteristics of image 35. For example, image 35 may be one or more sheets of paper with patches that are analyzed by measure device 62 such as a spectral photometer or calorimeter. According to the technique shown in the figure, measure device 62 scans image 35 and generates signals along path 63 representing the colors of the patches in some DICS such as CIE XYZ or CIE L*a*b* space. Output device 30 or some component controlling output device 30 generates signals along path 33 representing the patches in some output-DDCS such as printer CMYK space.

The device-independent and the device-dependent representations generated along paths 63 and 33, respectively, provide selected points in the two color spaces that define a forward function $f_o$ representing the way in which output device 30 converts the device-dependent representation into real-world colors. In response to these signals, calibration device 67 derives output-device map 23 which is an inverse function $f_o^{-1}$ from the DICS to the DDCS. For example, if measure device 62 generates values in CIE L*a*b* space and output device 30 generates the image in response to signals in some CMYK space, then the forward function corresponding to output device 30 may be denoted as $f_o$: CMYK→L*a*b* and the inverse function corresponding to output-device map 23 may be denoted as $f_o^{-1}$: L*a*b*→CMYK.

The way in which these two components work together is illustrated in FIG. 13B. Output-device map 23 effects a transformation $f_I^{-1}$ on values representing colors in some DICS to obtain values in some output-DDCS. Output device 30 effects a transformation $f_I$ on the values in the output-DDCS to obtain a replica image with real-world colors. If the real-world colors are expressed in some DICS such as CIE XYZ space, the transformation may then be expressed as a mapping from the output-DDCS to CIE XYZ as described above. The end-to-end effects of these two components is to effect a transformation from one DICS to another DICS. According to the example discussed above and illustrated in the figure, the transformation maps from CIE L*a*b* space to CIE XYZ space, which may be denoted as $F_o$: L*a*b*→XYZ.

FIGS. 3A and 3B are schematic representations of points and regions in two color spaces. These figures illustrate corresponding points and regions in CIE XYZ space and CIE L*a b* space, discussed more fully below; however, these figures are useful to illustrate principles of a mapping relationship between arbitrary color spaces. As shown in the figures, points 101–104 in one color space correspond to points 111–114, respectively, in another color space. The points along the four straight-line segments connecting these references points in the color space of FIG. 3A space correspond to points along the curved and straight-line segments connecting the referenced points in the color space of FIG. 3B.

As these figures show, the correspondence is often nonlinear. Because the transformation between color spaces usually cannot be expressed in a closed or analytical form, these transformations are often implemented by a look-up table, from which values of intermediate points may be obtained by interpolation.

For reasons that are discussed below, preferred embodiments of systems incorporating scanners and printers use two DICS. Scanner signals are mapped into CIE XYZ space and printer signals are mapped from CIE L*a*b* space. It is, therefore, necessary to provide a map or transformation from CIE XYZ to CIE L*a*b* space. This transformation may be denoted $f_T$: XYZ→L*a*b*. As mentioned above, this transformation is illustrated in FIGS. 3A and 3B. In such embodiments, controlling device 20 converts signals received from path 12 into signals generated along path 31 according to a transformation $f_C$ that is equivalent to a cascaded application of the transformations discussed above, denoted here as $f_C = f_I^{-1} \cdot f_T \cdot f_o^{-1}$, or $f_C$: RGB→CMYK=$f_I^{-1}$: RGB→XYZ·$f_T$: XYZ→L*a*b*·$f_o^{-1}$: L*a*b*→CMYK.

The effect of this transformation in conjunction with the other transformations is illustrated in FIG. 13C. As explained above, input device 10 and input-device map 21 effect a transformation from one DICS to another DICS such as from CIE XYZ space to CIE XYZ space, denoted as $F_I$: XYZ→XYZ. Output-device map 23 and output device 30 effect a transformation from one DICS to another DICS such as from CIE L*a*b* space to CIE XYZ space, denoted as $F_o$: L*a*b*→XYZ. By effecting a transformation from CIE XYZ space to CIE L*a*b* space, the $f_T$ transformation provides the link required to couple the $F_1$ and the $F_o$ transformations together.

The end-to-end effect of these coupled transformations represents the overall operation of the color image reproduction system. According to the example discussed above and illustrated in the figure, this end-to-end effect is a mapping $F_S$ from CIE XYZ space to CIE XYZ space which is, as mentioned above, equivalent in principle to an identity matrix. In absence of arithmetic round off errors and accuracy errors in the component transformations, the color image reproduction system is a transparent system that is able to reproduce an original image perfectly.

Unfortunately, even if the transformations could be implemented perfectly, reproduction errors still occur because practical input and output devices have limited gamuts that are generally not coextensive. As a result, the perceived accuracy of the replica depends on the ability of the system to substitute an in-gamut color that is indistinguishable from each out-of-gamut color. This process is sometimes referred to as gamut mapping.

Gamut Mapping

As mentioned above, input and output devices are capable of sensing or reproducing only a portion of the full range of colors that can be discerned by a human observer. The "gamut" of a scanner, for example, refers to the range of colors that can be sensed by that scanner. The gamut of a printer refers to the colors that can be generated by that printer. The colors that can be reproduced are referred to as "in gamut" colors and the colors that cannot be reproduced are referred to as "out-of-gamut" colors.

FIG. 4 is a schematic representation of two hypothetical device gamuts. Closed contour 120 represents a two-dimensional projection of a normalized color space, such as the CIE xy chromaticity diagram, that represents the chromaticity of the visible spectrum. Colors are plotted in the diagram according to wavelength. The shortest wavelengths appear in the lower-left region within contour 120 and the longest wavelengths appear in the lower-right region within contour 120.

The triangle with vertices at points 121–123 represents a device gamut that is typically represented in an RGB space; however, as shown, the boundary of this gamut is plotted in CIE xy space. Vertex 121 represents the extent to which the gamut includes colors in the red portion of the spectrum. The vertices at points 122 and 123 represent the extent to which this gamut includes colors in the green and blue portions of the spectrum, respectively. Ignoring granularity due to the discrete nature of digital devices, a device having this gamut is capable of reproducing all of the colors inside this triangle.

Similarly, the polygon with three of its vertices at points 126–128 represents a device gamut that is typically represented in CMY space; however, as shown, the boundary of this gamut is plotted in CIE xy space. The vertices at points 126–128 correspond to colors in the cyan, magenta and yellow portions of the spectrum, respectively. Ignoring granularity due to digital implementations, a device having this gamut is capable of reproducing all colors included within the polygon.

FIGS. 5A and 5B are schematic representations of points and hypothetical gamut boundaries in CIE L*a*b* space.

The L* coordinate represents luminance or brightness and the a*,b* coordinates represent color. Points having the same L* coordinate have the same luminance and points having the same angle with respect to the a*,b* axes have the same color or hue. The distance between a point and the L* axis is a measure of chroma magnitude or chromaticity. Points along the L* axis represent shades of gray from black to white which are neutral in color.

FIG. 5A illustrates two hypothetical gamuts 131 and 133 in L*a*b* color space as viewed along the L* axis. FIG. 5B illustrates gamuts 131 and 133 as viewed along the b* axis. The gamut boundaries shown in FIG. 5A as well as in other figures are intended to provide simple illustrations suitable for understanding principles of the present invention. They are not intended to represent the boundaries of gamuts for actual devices which are generally more complex.

Circles 131 and 133 shown in FIG. 5A illustrate the locus of points in plane 130 at the boundaries of the two gamuts. Point 134 is inside gamut 131 but outside gamut. Point 136 is inside both gamuts. As may be seen from the two figures, gamut 131 includes a greater range of colors and luminance than does gamut 133. The gamut of a typical scanner often includes a greater range of colors than does the gamut of a typical printer. It is not uncommon, however, for a printer gamut to include some colors that are outside a scanner gamut. This situation poses no difficulty because the scanner inherently maps such colors into its own gamut.

Mapping In-Gamut Colors

As mentioned above, transformations from a first color space to a second color space are often non-linear and usually difficult if not impossible to express in some closed or analytical form. These transformations are generally implemented by an approximation technique such as multi-dimensional interpolation of entries in a LUT. Each entry in the LUT contains coordinates of a specific point in the first color space and coordinates of the corresponding point in the second color space. For any arbitrary point in the first color space, the coordinates of the corresponding point in the second color space can be approximated by interpolating coordinates of selected table entries. Trilinear, prism, pyramidal and tetrahedral interpolation techniques and a number variations of such techniques are known; however, some form of tetrahedral interpolation is generally preferred.

According to tetrahedral interpolation, the LUT is searched to find entries representing points in the first color space that define the vertices of the smallest tetrahedron that encloses the arbitrary point. Interpolation coefficients are calculated based on the relative position of the arbitrary point with respect to the four vertices. Finally, an approximation of the mapped point is obtained by using the interpolation coefficients to form a linear combination of the coordinates in the second color space that correspond to the four vertices. This linear combination may be represented as:

$$x_P = a_1 x_1 + a_2 x_2 + a_3 x_3 + a_4 x_4$$

$$y_P = a_1 y_1 + a_2 y_2 + a_3 y_3 + a_4 y_4$$

$$z_P = a_1 z_1 + a_2 z_2 + a_3 z_3 + a_4 z_4$$

where $x_P$=the point in second color space corresponding to the arbitrary point, $a_1$ through $a_4$ are the coefficients of interpolation, $(x_1, y_1, z_1)$=coordinates of vertex 1 in the second color space, ($x_2,y_2,z_2$)=coordinates of vertex 2 in the second color space, ($x_3,y_3,z_3$)=coordinates of vertex 3 in the second color space, and ($x_4,y_4,z_4$)=coordinates of vertex 4 in the second color space.

Additional information regarding various forms of interpolation may be obtained from H. R. Kang, "Color Technology for Electronic Imaging Devices," SPIE Optical Engineering Press, 1997, pp. 64–101, 141–152 and 248–251, which is incorporated herein by reference.

Mapping Out-of-Gamut Colors to Gamut Boundary

In preferred embodiments, out-of-gamut colors are mapped onto the boundary of the gamut by projecting the color onto the line in color space representing neutral (gray) colors and clipping the projection at the gamut boundary. This can be performed conveniently in CIE L*a*b* space where points on the L* axis represent neutral colors.

Referring to FIG. 6A, the out-of-gamut color represented by point 134 is mapped to the color represented by point 135 on the gamut boundary by projecting a line from point 134 to the L* axis and finding the intersection of the projection with the boundary. If possible, the projection is orthogonal to the L* axis so that the luminance level is preserved.

An orthogonal projection to the L* axis is not always possible. Referring to FIG. 6B, the colors represented by points 141 and 144 have luminance levels that lie outside the gamut. The projection from point 141 is made to point 142, which represents the minimum value for L* in the gamut along the neutral-color line. The projection from point 144 is made to point 145, which represents the maximum value for L* in the gamut along the neutral-color line.

This mapping may be performed in other color spaces. For example, in CIE XYZ space, the points of neutral color define a line for which $x/x_o=y/y_o=z/z_o$, where ($x_o,y_o,z_o$) specifies normalization coordinates for the color space. An out-of-gamut color may be mapped to the intersection of the gamut boundary with a curve connecting the point to this line. The curve corresponds to the orthogonal projection in L*a*b* space that preserves luminance. Alternatively, a straight-line projection or some other curve can be used in XYZ space, which will provide a different result.

Extending the Color Range for the Input-Device Gamut

The accuracy of input-device map 21 provided by a technique such as that illustrated in FIG. 2A is enhanced if the range of colors conveyed by image 15 is at least as broad as the gamut of input device 10. In other words, it is very likely that the accuracy of input-device map 21 will be very poor in those regions of color space that are not represented by any patches in image 15. This poor accuracy can cause an input-device transformation to map colors in a way that does not preserve relative chroma magnitudes.

Referring to FIG. 7, point 165 represents an out-of-gamut color that has a chroma magnitude greater than the chroma magnitude of an in-gamut color represented by point 155. If input-device map 21 is derived from only the colors available from gamut 150, then a color represented by a point such as point 165 will be mapped by interpolation to point 167 inside the boundary of gamut 150. The color will be mapped inside the gamut boundary because the four points defining the smallest tetrahedron that encloses point 165 are all on the gamut boundary. In other words, because input-device map 21 is formed from only colors found within gamut 150, there are no points outside the gamut to provide a vertex for interpolation. The extent to which a point representing an out-of-gamut color is mapped to a point inside the boundary will depend on the accuracy and resolution of the interpolation points and the convexity of the local gamut boundary. If the accuracy of the input-device transformation is sufficiently poor or the convexity of the local gamut boundary is sufficiently large, the chroma magnitude of the color represented by point 167 may be less than the chroma magnitude of the color represented by point 155. This result may be perceived as an inversion of chromaticity, sometimes referred to as tone inversion.

Tone inversion may be avoided or at least reduced by using a broader range of colors to derive the input-device map. One way to produce a broader range of colors is to use a printer or other output device with a very broad gamut to generate image 15. Such devices are usually expensive or difficult to acquire.

Another way to produce a broader range of colors is to use multiple printers that have widely varying gamuts or to operate one or more printers in multiple modes. In this context, "mode" refers to a number of operating conditions including printing resolution (dpi), choice of colorants or media, and half-toning methods or stochastic screening techniques.

FIG. 7 is a schematic representation of respective gamuts 150 and 160 for two printers or, alternatively, one printer operating in two different modes. For ease of explanation, either or both of these situations are included in the following discussion that refers to gamuts of different printers.

FIG. 14 illustrates one method for deriving an input-device map 21 to overcome tone inversion. First, using a technique similar to that described above, an inverse function $g_1^{-1}$ is obtained (step S241) for the points in gamut 150 representing colors printed by the first printer. Similarly, an inverse function $g_2^{-1}$ is obtained (step S242) for the points in gamut 160 representing colors printed by the second printer. If a color is represented by points in both gamuts (step S243) such as those represented by points 152 and 162, the inverse function $f_I^{-1}$ for input-device map 21 is equal to the average of the inverse functions (step S244). The "same" color from two sets of patches will not necessarily be mapped by the input device to the same point in DDCS. The difference in mapped points may occur due to noise in the scanning process and/or because of minor differences in the actual colors.

If a color is represented by a point in only gamut 150 (step S245) such as that represented by point 151, the inverse function $f_I^{-1}$ is equal to the inverse function $g_1^{-1}$ obtained for that gamut (step S246). If a color is represented by a point in only gamut 160 (step S247) such as that represented by point 166, the inverse function $f_I^{-1}$ is equal to the inverse function $g_2^{-1}$ obtained for that gamut (step S248). If a color is represented by point that is in neither gamut such as the color represented by point 165, a projection is made to a line representing neutral colors (step S249) and the points $p_1$ and $p_2$ of intersection of that projection with the boundary of gamut 150 and 160, respectively, is determined (step S250). If the point of intersection $p_1$ with gamut 150 represents a color with a greater chroma magnitude than the point of intersection $p_2$ with gamut 160 (step S251), then point $p_1$ is selected to be the mapped point (step S252). Otherwise, point $p_2$ is selected to be the mapped point (step S253). Alternatively, the point of intersection representing the color with the largest magnitude chroma coordinate may be selected.

In the example shown in FIG. 7, the projection from point 165 intersects the boundaries of the two gamuts at points 166 (point $p_2$) and 167 (point $p_1$). The color represented by point 166 has the larger chroma magnitude; therefore, point 166 is selected to define the mapping for the color represented by point 165.

This relationship may be summarized as follows:

$$f_I^{-1}(p)=\tfrac{1}{2}[g_1^{-1}(p)+g_2^{-1}(p)]$$

if p is in both gamut 1 and gamut 2;

$$f_I^{-1}(p)=g_1^{-1}(p)$$

if p is in gamut 1 but not in gamut 2;

$$f_I^{-1}(p)=g_2^{-1}(p)$$

if p is in gamut 2 but not in gamut 1;

$$f_I^{-1}(p)=g_1^{-1}(p_1)$$

If p is in neither gamut 1 nor gamut 2 and the croma of $p_1$ is greater than the chroma of $p_2$; and $$f_I^{-1}(p)=g_2^{-1}(p_2)$$

otherwise,
where
$p_1$=the intersection of a projection of point p onto the neutral-color line and the boundary of gamut 1, and
$p_2$=the intersection of a projection of point p onto the neutral-color line and the boundary of gamut 2.

FIG. 15 illustrates major components of one way for deriving a transformation in this manner. Check gamuts 82 receives information from path 81 representing one or more points in color space and determines whether a respective point p is in either or both of two gamuts. If point p is in the first gamut, information representing that point is passed along path 83 to transformation 91 which implements inverse function $g_1^{-1}$ discussed above. If point p is in the second gamut, information representing that point is passed along path 84 to transformation 92 which implements inverse function $g_2^{-1}$ discussed above. If point p is in both gamuts, information is passed to both transformations and an indication of this is passed along path 85. If point p is in neither gamut, information representing that point is passed along path 86.

Projection/clip chroma 87 projects a line from point p to the neutral-color line, determines the intersection or clip point $p_1$ of this projection with the boundary of the first gamut, and determines the chroma for point $p_1$. In one embodiment, the chroma is determined from the chroma magnitude which, in L*a*b* space, is equal to the square root of the sum of the squares of the a* and b* coordinates. In another embodiment, the chroma is determined from the magnitude of the largest coordinate which, in L*a*b* space is the larger of |a*| and |b*|. Similarly, projection/clip chroma 88 projects a line from point p to the neutral-color line, determines the intersection or clip point $p_2$ of this projection with the boundary of the second gamut, and determines the chroma for point $p_2$.

Compare 89 determines whether point $p_1$ or point $p_2$ has the larger chroma. If point $p_1$ has the larger chroma, compare 89 passes information representing point $p_1$ along path 83 to transformation 91. If point $p_2$ has the larger chroma, compare passes information representing point $p_2$ along path 84 to transformation 92.

Select 93 receives the results of transformation 91 and transformation 92 and, if the indication received from path 85 indicates point p is in both gamuts, generates along path 94 information representing the average of the results received from both transformations. If the indication received from path 85 does not indicate point p is in both gamuts, select 93 generates along path 94 information representing the sum of the results received from both transformations. In this embodiment, it is assumed that if no information is passed to a respective transformation, that transformation produces a result equal to zero; therefore, the sum of the results will be equal to whichever transformation was passed information.

This technique may be used with any number (N>1) of gamuts by obtaining an inverse transformation for each gamut, determining whether a point p is in all of the gamuts and, if so, taking the average of the respective inverse transformations for each gamut. If the point is not in all gamuts, a check is made to determine if point p is in some combination of N–1 gamuts. If so, an average of the respective inverse transformations for those N-1 gamuts is taken. If not, a check is made for all combinations of N-2 gamuts. This process continues until it is determined that point p is in none of the gamuts. A projection to the neutral-color line is made and a check is made to determine all intersections with various gamut boundaries. The intersection with the largest chroma magnitude, or alternatively the largest chroma coordinate, is selected and the appropriate inverse transformation is taken of that point.

Device and Media Independence

In preferred embodiments, input-device map 21 is independent of output device 30, output device map 23 is independent of input device 10, and both maps are independent of the media used by output device 30 to generate the replica. Nevertheless, if a color image reproduction system uses multiple input devices, output devices and/or media types, considerable memory is required to store the transformation LUT for each. The technique described below can reduce the amount of memory required to store LUT by eliminating the need for multiple transformations to accommodate media variations and by simplifying the process required to accommodate differences in the dynamic range of luminance for various device gamuts. One embodiment of controlling device 20 that comprises components providing these features is illustrated in FIG. 9.

A degree of media independence may be achieved by normalize 24, which accounts for differences in the "white point" for respective media. This may be accomplished conveniently in the $f_T$ transformation discussed above that converts values from CIE XYZ space into CIE L*a*b* space. A point in XYZ space may be mapped into L*a*b* space by the following non-linear equations:

$$L^*=116m(y/y_o)-16$$

$$a^*=500[m(x/x_o)-m(y/y_o)]$$

$$b^*=500[m(y/y_o)-m(z/z_o)]$$

where
x,y,z=coordinates in CIE XYZ space,
$x_o,y_o,z_o$=maximum value for the coordinates in CIE XYZ space, $$m(t)=t^{1/3}$$

if $0,008856 < t \leq 1$, and $$m(t)=7.787t+(16/116)$$

if $0 \leq t < 0.008856$
for the independent variable t.

By varying the values of the $x_o, y_o, z_o$ coordinates, normalize 24 can normalize the XYZ space according to a desired medium "white point" as the mapping into L*a*b* space is performed. As a result, variations in media white point can be accommodated by an implementation that requires only enough memory to store one transformation LUT.

The desired white point for a particular medium can be determined by scanning the medium and transforming the scanned values using an appropriate transformation such as input-device map 21; however, more accurate results may be obtained if the white point is determined by analyzing the medium with a spectral photometer.

Normalize 24 can be made responsive to a variety of input. For example, normalize 24 may select normalization parameters from a table in response to a signal received from path 13 such as that provided by a user activated switch or selected software option, or it may adapt normalization parameters in response to a white point measurement provided by input device 10 and input-device map 21. The measurement may be taken during a special white-point calibration scan or possibly from an assessment of the predominant color in a scanned original image.

A greater degree of device independence may be achieved by compress 25, which accounts for differences in the range of luminance levels for input- and output-device gamuts. Referring to FIG. 5B, suppose gamut 131 represents a scanner gamut with a detectable range of luminance levels from L*=0 to 100, and gamut 133 represents a printer gamut with a reproducible range of luminance levels from L*=30 to 100. In the example shown, the two devices have the same upper limit but have different lower limits. The technique discussed here may be applied to devices with respective luminance ranges that differ in essentially any way.

As explained above, out-of-gamut colors such as the color represented by point 141 in FIG. 6B may be mapped to the minimum luminance level for a neutral color in the printer gamut. Alternatively, such colors may be mapped into the printer gamut by compressing the luminance level. In the example mentioned above, this could be accomplished by linear compression of luminance levels in the range from L*=0 to 40 into the range from L*=30 to 40. Luminance levels from L*=40 to 100 are unchanged. Essentially any form of compression may be used; however, linear compression of this type is inexpensive to perform, provides some gradation in luminance level rather than merely clipping all low-level colors to the minimum, restricts changes in luminance to lower levels where changes are not easily perceived, and preserves luminance values at higher levels where changes are more easily perceived.

Luminance compression can be provided easily without requiring an elaborate transformation. As a result, luminance dynamic range variations in device-dependent gamuts can be accommodated and a degree of device independent can be achieved without requiring significant additional memory to store a LUT.

This compression can be made responsive to a variety of input. Compress 25 may select compression parameters from a table in response to a signal received from path 14 such as that provided by a user activated switch or selected software option, or it may adapt the compression parameters in response to signals identifying an output device that are received from the output device itself.

Preferably, after luminance compression, the resulting L*a*b* coordinates for each picture element (pixel) is compared to thresholds and, if the color space coordinates representing that pixel have a prescribed relationship with respect to those thresholds, the L*a*b* coordinates are set to some specified values, say (100,0,0). This may be represented by the following pseudo code fragment:

if $L^* > L_{TH}$ and $|a^*| < a_{TH}$ and $|b^*| < b_{TH}$ then set L* equal to 100
set a* equal to 0
set b* equal to 0

The thresholds may be specified as $L_{TH}=95$, $a_{TH}=2$ and $b_{TH}=3$, for example.

This process is represented by white point background 26 in FIG. 9. The specified values represent a desired white point for the output replica. This process tends to remove artifacts from the replica that are created by noise in the scanning process and by arithmetic round off errors in the transformation processes. This operation may also be used to remove the background color of the original medium without changing the colors of the reproduced image.

Improving Accuracy of an Input Device Map

As mentioned above, transformations are often implemented by an interpolation of entries in a look-up table (LUT). Because the transformations are non-linear, the accuracy of the interpolation is affected by the distance between points represented by adjacent entries in the table.

As discussed above in connection with FIGS. 3A and 3B, a point can mapped from CIE XYZ space into CIE L*a*b* space by a set of analytical expressions. This type of transformation is not available for many color space mappings but it is useful to illustrate the accuracy of interpolation.

Point 107 is shown in FIG. 3A to be within a tetrahedron that has vertices at points 101–104. By applying tetrahedral interpolation to corresponding points 111–114 in L*a*b* space according to the relative position of point 107 with respect to the tetrahedral vertices, an approximate position can be obtained for the corresponding point in L*a*b* space. This approximate location is illustrated as point 118. By applying the three analytical expressions discussed above, an exact mapping in L*a*b* space for point 107 can be obtained. This exact mapping is shown as point 117. The distance between points 117 and 118 represents the interpolation error.

One common method for improving the accuracy of interpolation is to increase the density of the points represented in the LUT. Although this solution is simple in concept, it is often impractical because of the increase in cost for the memory required to store the LUT.

The interpolation accuracy of an input-device map may be improved without increasing the number of LUT entries by modifying some of the points represented in the LUT for selected regions of color space. One important region of color space that generally requires high accuracy is the region containing the points of neutral color. In some color spaces such as CIE L*a*b*, these points are coincident with the L* axis, or a*=b*=0.

The accuracy of interpolation for a selected region of a mapped color space can be improved by obtaining color patches for a selected color within the selected region, measuring the patch as necessary to obtain appropriate values in a DICS, scanning the patch to obtain appropriate values in the input-DDCS, and modifying entries in the LUT representing points adjacent to the selected color. Patches of selected colors may be obtained by choosing points that are interior to each region of interest, mapping the points to the appropriate output-DDCS, generating the appropriate patches. If the selected color is outside the gamut of a particular output device, another output device may be used.

The table entries corresponding to the four vertices are modified according to two different processes depending upon whether the region of interest is inside or outside the gamut. The process of improving accuracy for regions inside the gamut will be discussed first.

Improving Accuracy of In-Gamut Colors

In a preferred embodiment, the entries in the LUT correspond to uniformly spaced grid points in a color space. Because it is difficult if not impossible to obtain color patches for specific grid points in the color space, the values for essentially all of the LUT entries are calculated by interpolation of the values that can be obtained from actual color patches. The perceptible effect caused by the errors introduced by this process depend on a number of factors including the relative spacing of the color patches in the color space and the varying sensitivity of the human observer to changes in color across the color space.

The accuracy of a LUT derived in this manner can be improved by obtaining a very large number of patches having colors represented by points closely spaced in the color space; however, this is usually impractical. This technique overcomes this problem by deriving the LUT from a relatively small number of patches represented by colors widely separated in the color space and obtaining additional patches for selected in-gamut colors as required to improve the LUT accuracy in those regions of color space where transform accuracy is more important. As mentioned above, one important region contains the points of neutral color.

For a LUT used for tetrahedral interpolation, an additional patch for a selected in-gamut color may be obtained by identifying an interior point of a tetrahedron having four vertices defined by points in the LUT. An interior point $(x_P, y_P, z_P)$ to a specific tetrahedron defined by vertices at points $(x_1, y_1, z_1)$ through $(x_4, y_4, z_4)$ may be determined from the expressions:

$$x_P = a_1 x_1 + a_2 x_2 + a_3 x_3 + a_4 x_4$$

$$y_P = a_1 y_1 + a_2 y_2 + a_3 y_3 + a_4 y_4$$

$$z_P = a_1 z_1 + a_2 z_2 + a_3 z_3 + a_4 z_4$$

where $a_1$ through $a_4$ are coefficients of interpolation chosen such that $a_1 + a_2 + a_3 + a_4 = 1$ and all the coefficients are greater than zero.

Referring to FIG. 3A, suppose points 101–104 represent vertices at points $(x_1, y_1, z_1)$ through $(x_4, y_4, z_4)$, respectively. By setting the coefficients of interpolation appropriately, any point internal to the tetrahedron may be chosen. Point 107, for example, may be selected by choosing the interpolation coefficients appropriately.

The interpolation process used to derive a LUT entry from measured values is essentially the same process as that used to implement the device transforms themselves. By obtaining additional color patches in selected regions of color space, the distance between the measured points in those regions is reduced and the accuracy of interpolation between these more closely spaced points is enhanced. As a result, the accuracy of the transform implemented by the LUT is also enhanced. This process may be repeated until a desired level of transformation accuracy is achieved.

Referring to FIG. 16, this process may be carried out by printing color patches that correspond to some set of points separated in color space by some suitably large distance (step S261) and deriving from these patches a LUT with uniform spacing (step S262). The tetrahedral regions formed by points in the LUT entries are examined to determine if the mapping error is unacceptable large (step S263). For any particular tetrahedron, the mapping error may be determined by selecting an interior point of the tetrahedron, printing a corresponding patch, measuring the actual color of the patch using a measuring device such as a spectral photometer, and comparing the measured values with the values obtained by LUT interpolation. The way in which an interior point may be selected is described above.

If no region has an unacceptably large error, the process terminates (step S264), otherwise a point interior to that tetrahedral region is selected and a corresponding color patch is printed (step S265). The color patch is scanned (step S266) and the information in the LUT entries for the four points defining the tetrahedral region are derived again using the new color point (step S267). The color patch and scanned values used to determine the mapping error may also be used here. This process reiterates until no tetrahedral region represented by LUT entries has interpolation errors that are unacceptably large.

Improving Accuracy for Out-of-Gamut Colors

The accuracy of LUT entries for out-of-gamut colors can be improved by obtaining additional patches for selected out-of-gamut colors as required to improve the LUT accuracy in those regions of color space where transform accuracy is more important. These patches may be obtained from another source such as a different output device or by operating a given output device in a different mode, as described above. The coordinates of the point in DICS representing the patch color may be obtained from a measuring device such as a spectral photometer.

Referring to FIG. 17, a method for improving the accuracy of out-of-gamut colors comprises using current LUT entries to obtain an initial estimate of the patch color space coordinates (step S271), comparing the estimated coordinates to the actual (measured) coordinates to obtain the estimation error (step S272), determining if the estimation error is acceptably small (step S273) and, if not, modifying current LUT entries according to the estimation error (step S274). The process terminates (step S275) when the estimation error is acceptably small.

An initial estimate of the coordinates $(x_s, y_s, z_s)$ in the DICS for a selected out-of-gamut color is obtained by tetrahedral interpolation of the four points closest to the scanned point according to:

$$x_S = a_1 x_1 + a_2 x_2 + a_3 x_3 + a_4 x_4$$

$$y_S = a_1 y_1 + a_2 y_2 + a_3 y_3 + a_4 y_4$$

$$z_S = a_1 z_1 + a_2 z_2 + a_3 z_3 + a_4 z_4$$

where interpolation coefficients $a_1$ through $a_4$ are determined by the location of the interpolated point relative to the locations of these four closest points.

The estimation errors in the x, y and z dimensions are obtained from the expressions:

$$e_x = x_m - x_S$$

$$e_y = y_m - y_S$$

$$e_z = z_m - z_S$$

where the coordinates $x_m$, $y_m$ and $z_m$ are known from measurements of the color patch. Alternatively, other measures of estimation error may be used such as the square of the differences shown above.

The coordinates of the four closest points are modified to obtain a lower estimation error. For example, the x coordinates are modified reiteratively according to the following expressions:

$$x_1(i) = x_1(i-1) - \eta \frac{\partial e_x}{\partial x_1}$$

$$x_2(i) = x_2(i-1) - \eta \frac{\partial e_x}{\partial x_2}$$

$$x_3(i) = x_3(i-1) - \eta \frac{\partial e_x}{\partial x_3}$$

$$x_4(i) = x_4(i-1) - \eta \frac{\partial e_x}{\partial x_4}$$

where
 i=index of iteration, and
 η=convergence coefficient.

The y and z coordinates are modified in a similar manner. After each iteration, a new interpolation is performed according to $$x_S = a_1 x_1(i) + a_2 x_2(i) + a_3 x_3(i) + a_4 x_4(i)$$

$$y_S = a_1 y_1(i) + a_2 y_2(i) + a_3 y_3(i) + a_4 y_4(i)$$

$$z_S = a_1 z_1(i) + a_2 z_2(i) + a_3 z_3(i) + a_4 z_4(i)$$

and a new estimation error is obtained as explained above. The iteration continues until the estimation error is acceptably small.

By using these two techniques, the interpolation accuracy of a LUT for both in-gamut and out-of-gamut colors may be improved without increasing the number of entries in the LUT.

Retaining Useful Information in Self-Calibration Techniques

The operational characteristics of many input and output devices change with time. These changes cause shifts in the location and size of device gamuts in color space. Similar changes may occur as a result of operating an output device in a new mode or using different media. As a result, it is desirable to modify transformations to account for these changes so that the reproduction accuracy of a system can be maintained. The following technique accounts for changes in the gamut of output device 30 by deriving a recalibration transformation.

FIG. 8 is a schematic representation of a shift in the gamut of a hypothetical output device such as that caused by component aging. Gamut 170 represents the original characteristics of output device 30 which was used originally to calibrate the color image reproduction system. The colors represented by points 171 and 173 are in the original gamut and colors represented by points 185 and 188 are outside the original gamut. Points 185 and 188 are mapped onto the boundary of the original gamut at points 176 and 179, respectively.

Gamut 180 represents current characteristics of output device 30 which is to be used to recalibrate the system. According to this new gamut, colors represented by points 181 and 188 are in the current gamut and colors represented by points 173 and 185 are outside the current gamut.

One way in which a system may be recalibrated is to merely invoke the procedures described above, deriving new device maps in a manner similar to that done to derive original maps. This approach is not attractive because the derivation of an accurate map for an entire gamut can require considerable time and expense and because it discards useful information that may not be available at the time of recalibration. For example, patches of a particular color that were used to derive an original device map may not be available at the time of recalibration.

The technique described below overcomes these problems by providing for self-recalibration and by restricting the recalibration to those regions of color space that are inside the current output device gamut. As a result, LUT entries for colors such as those represented by points 181 and 188 are affected by the recalibration process but LUT entries for colors such as those represented by point 173 are not affected.

Referring to FIGS. 10 and 18, controlling device 20 selects values in the output-DDCS to cause output device 30 to generate image 37 (step 281) containing patches of colors that are inside the current output device gamut. Input device 10 scans image 37 (step 282) to generate values within input-DDCS, which input device map 21 and output device map 23 collectively transform into values in the output-DDCS (step 283) according to some transformation such as $f_C$ discussed above. In some embodiments, input-device map 21 and output-device map 23 are merged into a single LUT to reduce the amount of memory required to store the transformation. In such embodiments, the recalibration technique described here is especially attractive. Because the output device gamut has changed, some of the values obtained from output device map 23 will differ significantly from the corresponding values used to generate the color patches.

These differences can be expressed as a transform e: $CMY_{CUR} \rightarrow CMY_{ORIG}$ that maps color coordinates $CMY_{CUR}$ pertaining to the current output device gamut to color coordinates $CMY_{ORIG}$ as they pertain to the original gamut. By deriving the inverse function $e^{-1}$: $CMY_{ORIG} \rightarrow CMY_{CUR}$ (step 284), recalibrate map 22 can apply appropriate correction to obtain proper values for output device 30. This inverse function is referred to herein as a recalibration transformation.

In one embodiment, the recalibration transformation is implemented as a LUT. The recalibration LUT includes information in each table entry indicating whether the respective point represented by that table entry is inside or outside the current output device gamut. During operation of the color image reproduction system, referring to FIGS. 10 and 19, input device 10 scans an original image (step 291), output device map 23 subsequently obtains an interim mapping of pixels in the output-DDCS (step 292) and recalibrate map 22 selectively applies the recalibration transformation to these mapped pixels as required. This is accomplished by identifying the four points in output-DDCS (step 293) that define the smallest tetrahedron enclosing the color point for a respective pixel, and interrogating the recalibration LUT entries (step 294) for these four points to determine if all are within the current output device gamut. If all points are in the current output device gamut, the recalibration transformation is applied (step 295) by performing interpolation among those four points in the recalibration LUT. The results of this interpolation is used to control output device 30 for that particular pixel.

If at least one of the four points is not within the current output device gamut, the results obtained from the original output device map 23 is projected to the neutral-color line and clipped at the current gamut boundary (step 296). This point at the boundary is used to control output device 30 for the respective pixel.

FIG. 11 illustrates major components of one way for using the recalibration transformation discussed above. Path 71 receives information representing points in color space. In one embodiment, this information includes an indication whether each point is in the current output device gamut. In another embodiment, check gamut 73 determines this by comparing the color space coordinates of each point with the location of the current gamut boundary.

For either embodiment, check gamut 73 controls switch 72 to connect with path 74 if a respective point p is not in the current gamut. Project and clip 76 projects a line from point p to the neutral-color line and determines the intersection or clip point p' of this projection with the boundary of the current gamut. Information representing clip point p' is passed along path 78.

If point p is in the current gamut, check gamut 73 causes switch 72 to connect with path 75. Recalibration transformation 77 implements the $e^{-1}$ transformation discussed above and passes the results of this transformation along path 78.

What is claimed is:

1. A method for improving accuracy of a transformation implemented by a look-up table that maps colors from a first color space to a second color space for a color image reproduction system comprising an input device and an output device, said method comprises:
   constructing said look-up table, wherein the entries of said look-up table represent grid points that are derived by interpolation from a relatively small number of non-uniformly spaced points in said first color space,
   identifying a region of said second color space in which the accuracy of said transformation is to be improved, said region being less than said second color space,
   obtaining a medium conveying a selected color within said region of second color space,
   scanning said medium with said input device to obtain first values representing said selected color in said first color space,
   applying said transformation to map said first values to second values in said second color space and determining a transformation error for said map, and
   modifying one or more entries in said look-up table adjacent to said selected color, without increasing the number of entries in said look-up table and without changing the structure of said look-up table, to effect a change in said transformation so as to reduce said transformation error.

2. A method according to claim 1 wherein the entries of said look-up table represent grid points that are spaced substantially uniformly in said first color space, and wherein said change is effected in said transformation by deriving said one or more entries again by interpolation using said first and second values.

3. A method according to claim 1 wherein said one or more entries are modified reiteratively according to a numerical approximation technique that converges toward a transformation error equal to zero.

4. An apparatus for improving accuracy of a transformation implemented by a look-up table that maps colors from a first color space to a second color space for a color image reproduction system comprising an input device and an output device, said apparatus comprises components that:
   construct said look-up table, wherein the entries of said look-up table represent grid points that are derived by interpolation from a relatively small number of non-uniformly spaced points in said first color space,
   receive an identification of a region of said second color space in which the accuracy of said transformation is to be improved, said region being less than said second color space,
   obtain a medium conveying a selected color within said region of second color space,
   scan said medium with said input device to obtain first values representing said selected color in said first color space,
   apply said transformation to map said first values to second values in said second color space and determine a transformation error for said map, and
   modify one or more entries in said look-up table adjacent to said selected color, without increasing the number of entries in said look-up table and without changing the structure of said look-up table, to effect a change in said transformation so as to reduce said transformation error.

5. An apparatus according to claim 4 wherein the entries of said look-up table represent grid points that are spaced substantially uniformly in said first color space, and wherein said change is effected in said transformation by a component that derives said one or more entries again by interpolation using said first and second values.

6. An apparatus according to claim 4 wherein a component modifies said one or more entries reiteratively according to a numerical approximation technique that converges toward a transformation error equal to zero.

7. A medium readable by a machine embodying a program of instructions for execution by said machine to perform a method for improving accuracy of a transformation implemented by a look-up table that maps colors from a first color space to a second color space for a color image reproduction system comprising an input device and an output device, said method comprises:
   constructing said look-up table, wherein the entries of said look-up table represent grid points that are derived by interpolation from a relatively small number of non-uniformly spaced points in said first color space,
   receiving an identification of a region of said second color space in which the accuracy of said transformation is to be improved, said region being less than said second color space,
   obtaining a medium conveying a selected color within said region of second color space,
   scanning said medium with said input device to obtain first values representing said selected color in said first color space,
   applying said transformation to map said first values to second values in said second color space and determining a transformation error for said map, and
   modifying one or more entries in said look-up table adjacent to said selected color, without increasing the number of entries in said look-up table and without changing the structure of said look-up table, to effect a change in said transformation so as to reduce said transformation error.

8. A medium according to claim 7 wherein the entries of said look-up table represent grid points that are spaced substantially uniformly in said first color space, and wherein said change is effected in said transformation by deriving said one or more entries again by interpolation using said first and second values.

9. A medium according to claim 7 wherein said one or more entries are modified reiteratively according to a numerical approximation technique that converges toward a transformation error equal to zero.

10. An apparatus for improving accuracy of a transformation implemented by a look-up table that maps colors from a first color space to a second color space for a color image reproduction system comprising an input device and an output device, said apparatus comprises:

a look-up table constructor to construct said look-up table, wherein the entries of said look-up table represent grid points that are derived by interpolation from a relatively small number of non-uniformly spaced points in said first color space, a receiver to receive an identification of a region of said second color space in which the accuracy of said transformation is to be improved, said region being less than said second color space, an input unit to input a medium in said input device to obtain first values representing a selected color in said first color space, a mapper to apply said transformation to map said first values to second values in said second color space and determine a transformation error for said map, and a modifier to modify at least one entry in said look-up table adjacent to said selected color, without increasing the number of entries in said look-up table and without changing the structure of said look-up table, to effect a change in said transformation so as to reduce said transformation error.

* * * * *

UNITED STATES PATENT AND TRADEMARK OFFICE
CERTIFICATE OF CORRECTION

PATENT NO. : 6,204,939 B1
DATED : March 20, 2001
INVENTOR(S) : Tsung-Nan Lin, et al.

It is certified that error appears in the above-identified patent and that said Letters Patent is hereby corrected as shown below:

Column 23,
Line 14, please change "bv" to -- by --.

Signed and Sealed this

Twenty-third Day of October, 2001

Attest:

*Nicholas P. Godici*

NICHOLAS P. GODICI
*Attesting Officer*       *Acting Director of the United States Patent and Trademark Office*